(12) United States Patent
Itokawa

(10) Patent No.: US 6,784,927 B1
(45) Date of Patent: Aug. 31, 2004

(54) IMAGE PROCESSING APPARATUS AND IMAGE PROCESSING METHOD, AND STORAGE MEDIUM

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/213,953

(22) Filed: Dec. 17, 1998

(30) Foreign Application Priority Data

Dec. 22, 1997 (JP) .............................................. 9-353615

(51) Int. Cl.$^7$ ............................................. H04N 5/228
(52) U.S. Cl. ................................... 348/208.1; 348/169
(58) Field of Search ........................ 348/208.99, 208.1, 348/208.3, 208.6, 208.14, 169, 170, 699, 171, 172, 208.4; 382/103

(56) References Cited

U.S. PATENT DOCUMENTS

| | | | | |
|---|---|---|---|---|
| 5,371,539 A | * | 12/1994 | Okino et al. .............. | 348/208.6 |
| 5,731,832 A | * | 3/1998 | Ng .............................. | 348/155 |
| 5,845,009 A | * | 12/1998 | Marks et al. ................ | 382/228 |
| 5,973,733 A | * | 10/1999 | Gove .......................... | 348/142 |
| 6,144,405 A | * | 11/2000 | Toba ........................... | 348/155 |
| 6,169,573 B1 | * | 1/2001 | Sampath-Kumar et al. . | 348/169 |
| 6,246,437 B1 | * | 6/2001 | Kaneda .................. | 348/333.03 |
| 6,466,253 B1 | * | 10/2002 | Honjoh ......................... | 348/36 |

* cited by examiner

Primary Examiner—Wendy R. Garber
Assistant Examiner—Justin Misleh
(74) Attorney, Agent, or Firm—Morgan & Finnegan, LLP

(57) ABSTRACT

An image processing apparatus for correcting the position of a specific object included in a moving image formed by a plurality of successive images to a predetermined position on the frame, sets a reference point on the object included in the first image of the plurality of images, which serves as a reference image, detects the positions of points, which correspond to the reference point, from a plurality of second images, which are different from the first image, of the plurality of images, detects the shift amounts between the corresponding points and the reference point in units of images on the basis of the positions of the corresponding points detected from the plurality of second images, and the position of the reference point, and corrects the positions of the object included in the plurality of second images in correspondence with the shift amounts detected in units of images.

8 Claims, 19 Drawing Sheets

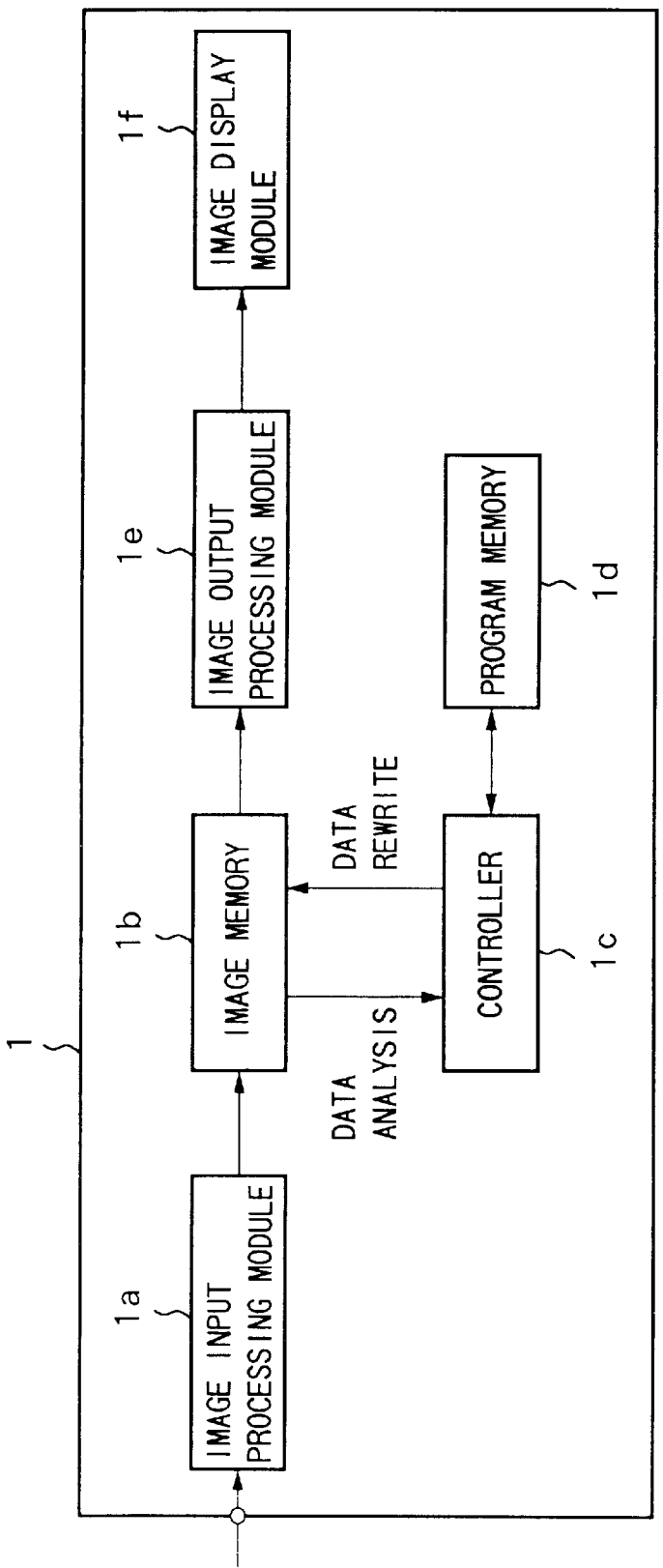

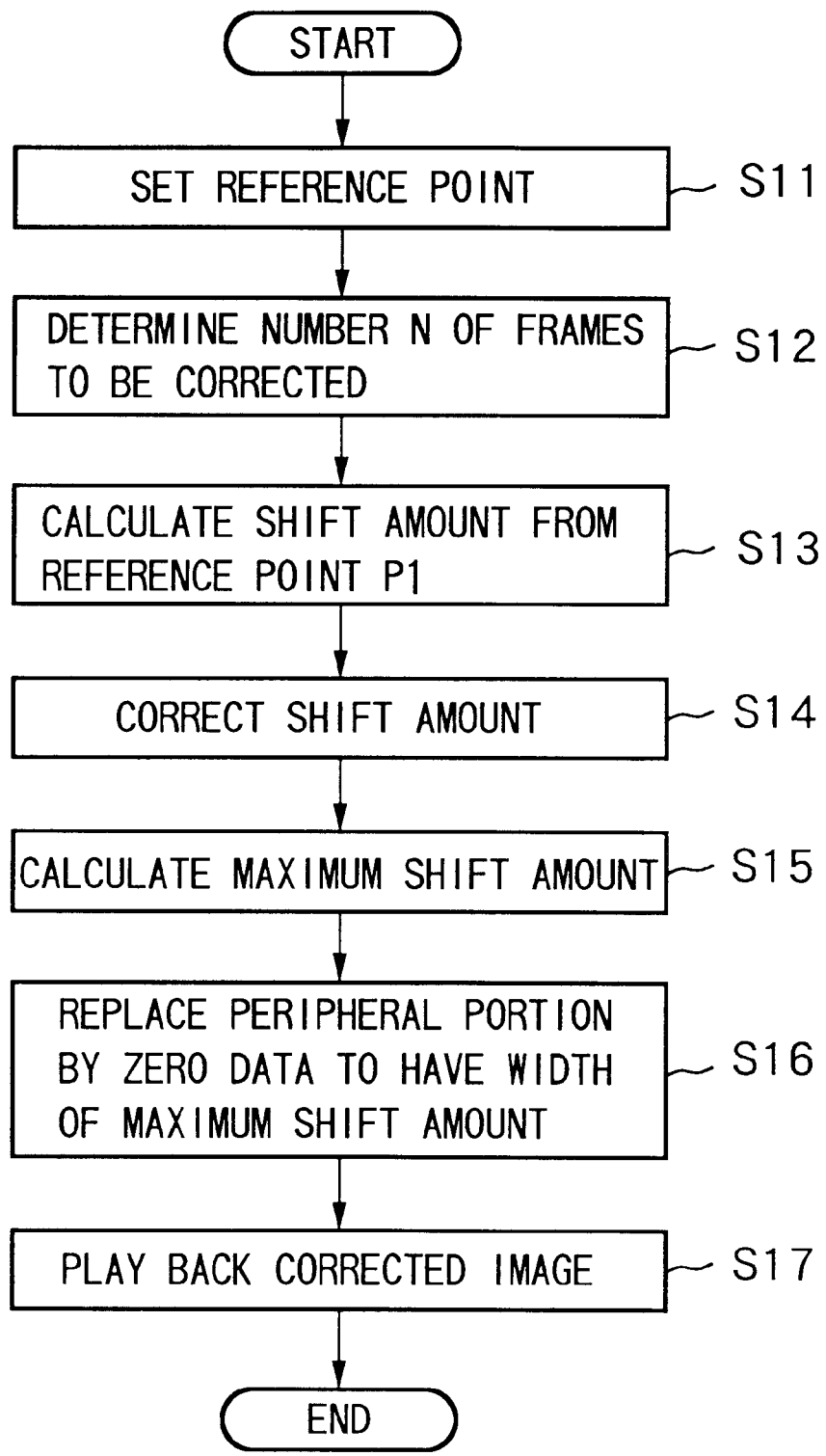

FIG.3A i = 1
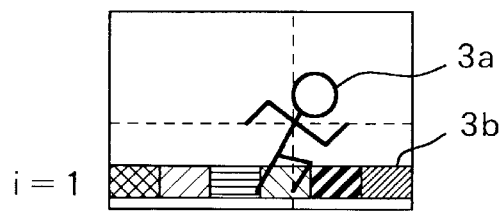
FIG.3B i = 2
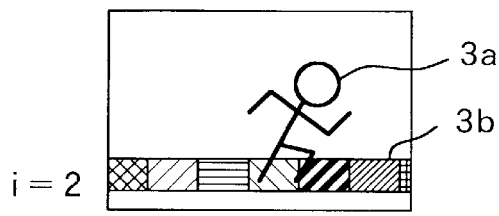
FIG.3C i = 3
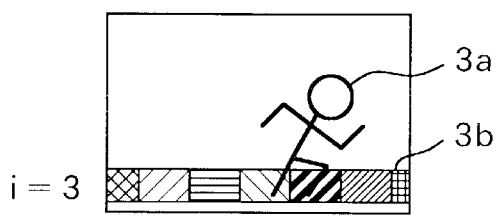
FIG.3D i = 4
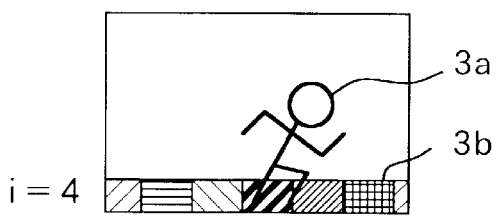
FIG.3E i = 5
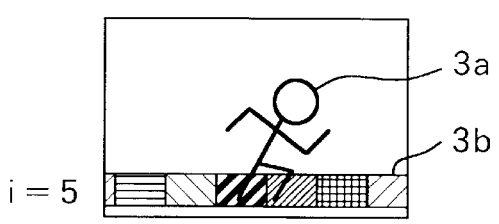
FIG.3F i = 6
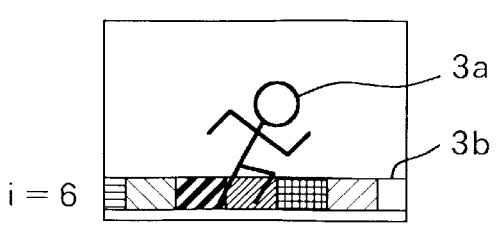

FIG.4A  i = 1  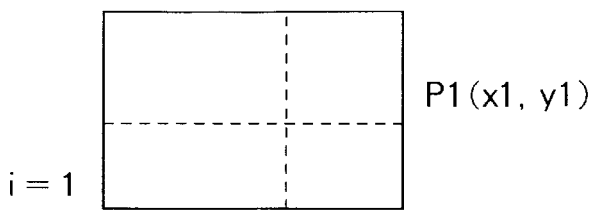  P1(x1, y1)
FIG.4B  i = 2  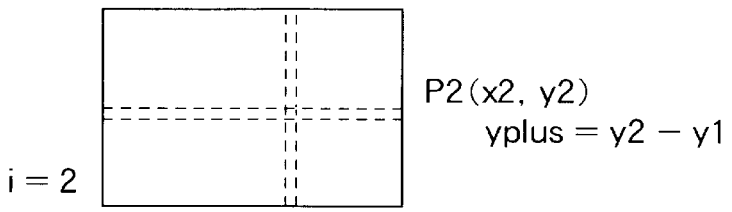  P2(x2, y2)
yplus = y2 − y1
FIG.4C  i = 3  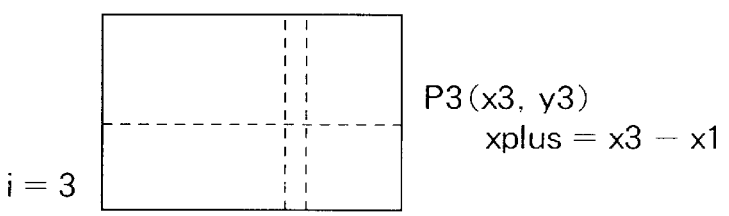  P3(x3, y3)
xplus = x3 − x1
FIG.4D  i = 4  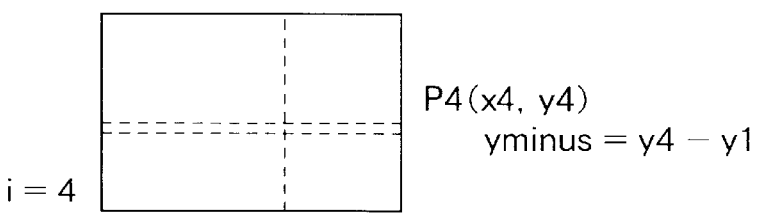  P4(x4, y4)
yminus = y4 − y1
FIG.4E  i = 5  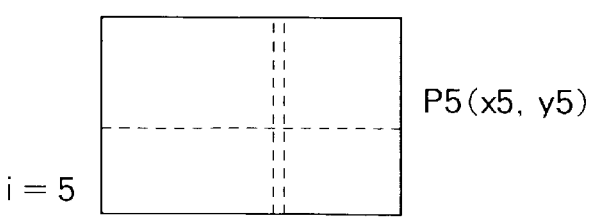  P5(x5, y5)
FIG.4F  i = 6  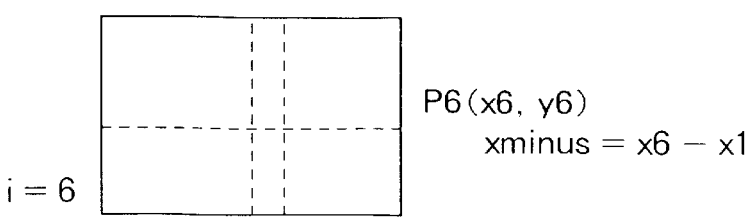  P6(x6, y6)
xminus = x6 − x1 i = 1 i = 2 i = 3 i = 4 i = 5 i = 6 i = 1 i = 2 i = 3 i = 4 i = 5 i = 6 i = 1 i = 2 i = 3 i = 4 i = 5 i = 6 i = 3

14a i = 4

IMAGE PROCESSING APPARATUS AND IMAGE PROCESSING METHOD, AND STORAGE MEDIUM

BACKGROUND OF THE INVENTION

The present invention relates to an image processing apparatus and image processing method, and a storage medium and, for example, to an image processing apparatus and image processing method, which locate an object, which is being tracked by the photographer, at the center of the frame, and a storage medium.

As moving image input apparatuses (imaging apparatuses), video cameras have prevailed. The most fundamental function of the video camera is to record an input image on a recording medium such as a tape or the like, but the input image may often be different from that the photographer intended.

In order to prevent this as much as possible, various functions that help the photographer have been proposed. As one of such functions, a camera shake correction function is known. The camera shake correction function optically or electrically corrects vibration produced upon photographing when the photographer holds the video camera by the hand.

However, the conventional camera shake correction function can hardly allow the photographer to track an object while locating the object at a specific position within the image frame when the photographer follows the moving object via the video camera. This problem will be explained below with reference to the accompanying drawings.

FIGS. 3A to 3F show an example of the problem to be solved by the present invention. Referring to FIGS. 3A to 3F, reference symbol i denotes a frame image obtained at a predetermined time interval. The following explanation will be given with reference six frames images i=1 to 6.

A video 3a displayed at nearly the center in the frame is an object, which is being tracked by the photographer, and exemplifies a person who is running to the right in the frame. A video 3b displayed below the video 3a represents a background portion, which is still in position unless the video camera is moved. In such situation, the photographer is photographing while moving the video camera in correspondence with the movement of the object, so as to locate the object at nearly the frame center.

However, since there is no means for synchronizing the movements of the object and video camera, a skilled technique is required for the photographer to locate the object at a predetermined position within the frame. For this reason, it is very hard for the photographer who is not skilled in photographing to always locate the object at nearly the center of the frame.

In the example shown in FIGS. 3A to 3F, the position of the object in the second frame (i=2) is in front of that in the first frame (i=1), and the position of the object in the third frame (i=3) is still in front of it.

Conversely, the position of the object in the fifth frame (i=5) is slightly behind that in the first frame (i=1), and the position of the object in the sixth frame (i=6) is still behind it.

As for position shifts in the vertical direction, the position of the object in the second frame (i=2) is higher than that in the first frame (i=1), and the position of the object in the fourth frame (i=4) is lower than it.

FIGS. 24A to 24F show an example of an ideal camera work. That is, the position of an object 13a is fixed in position and a background 13b alone moves among frame images.

In this manner, when the position of the object varies among frames, the object is photographed as a blurred image, and a visually preferred video cannot be obtained.

SUMMARY OF THE INVENTION

The present invention has been made in consideration of the above-mentioned objects and has as its object to correct the position of an object, which is being tracked by the photographer, to a predetermined position within the frame without producing any vibration upon playback even when a blurred moving image is recorded upon input.

In order to achieve the above object, an image processing apparatus according to the present invention is characterized by comprising the following arrangement.

That is, an image processing apparatus for correcting a position of a specific object included in a moving image formed by a plurality of successive images to a predetermined position on a frame, comprises:

reference point setting means for setting a reference point on the object included in a first image of the plurality of images, which serves as a reference image;

position detection means for detecting positions of corresponding points, which correspond to the reference point, from a plurality of second images, which are different from the first image, of the plurality of images;

shift amount detection means for detecting shift amounts between the corresponding points and the reference point in units of images on the basis of the positions of the corresponding points detected from the plurality of second images, and a position of the reference point; and corrected image generation means for generating a corrected image of the moving image by correcting positions of the object included in the plurality of second images in correspondence with the shift amounts detected by the shift amount detection means in units of images.

Preferably, the apparatus further comprises display means for displaying the corrected image, which is corrected by the corrected image generation means.

For example, the corrected image generation means includes:

image shift means for shifting the plurality of second images in correspondence with the shift amounts detected by the shift amount detection means in units of images;

maximum shift amount detection means for detecting maximum shift amounts in upper, lower, right, and left directions from the shift amounts produced with respect to original recording regions of the plurality of second images upon shifting the second images by the image shift means; and predetermined image insertion means for generating the corrected image of the moving image by inserting a predetermined image corresponding to the maximum shift amounts in the upper, lower, right, and left directions detected by the maximum shift amount detection means in the first image and the plurality of second images, which have been shifted by the image shift means.

Also, for example, the corrected image generation means includes:

image shift means for shifting the plurality of second images in correspondence with the shift amounts detected by the shift amount detection means in units of images; and image synthesis means for selecting images corresponding to missing portions, which have formed with respect to original recording regions of the plurality of second images upon shifting the second images by the image shift means, from the plurality of second images, and synthesizing the selected images as the images of the missing portions.

In order to achieve the above object, an image processing method according to the present invention is characterized by comprising the following arrangement.

That is, an image processing method for correcting a position of a specific object included in a moving image formed by a plurality of successive images to a predetermined position on a frame, comprises:

the reference point setting step of setting a reference point on the object included in a first image of the plurality of images, which serves as a reference image;

the position detection step of detecting positions of corresponding points, which correspond to the reference point, from a plurality of second images, which are different from the first image, of the plurality of images;

the shift amount detection step of detecting shift amounts between the corresponding points and the reference point in units of images on the basis of the positions of the corresponding points detected from the plurality of second images, and a position of the reference point; and the corrected image generation step of generating a corrected image of the moving image by correcting positions of the object included in the plurality of second images in correspondence with the shift amounts detected in units of images.

Furthermore, a computer-readable storage medium is characterized by implementing the above-mentioned image processing method using, e.g., a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram for explaining the arrangement of an apparatus according to an embodiment of the present invention;

FIG. 2 is a flow chart for explaining an algorithm according to the first embodiment of the present invention;

FIGS. 3A to 3F are views for explaining an input image according to the first embodiment of the present invention;

FIGS. 4A to 4F are views for explaining the calculation process of shift amount according to the first embodiment of the present invention;

DETAILED DESCRIPTION OF THE PREFERRED EMBODIMENTS

Figure 5A:
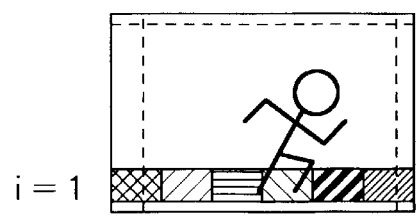
FIGS. 5A to 5F are views for explaining the correction process of shift amount according to the first embodiment of the present invention.

The preferred embodiments of the present invention will be described in detail hereinafter with reference to the accompanying drawings.

(First Embodiment)

FIG. 1 is a schematic block diagram for explaining the arrangement of an image processing apparatus according to this embodiment. In an image processing apparatus of this embodiment, when an image signal to be input is an analog signal, the analog signal is A/D-converted into digital data by an image input processing module 1a. The digital data output from the image input processing module 1a is stored in an image memory 1b.

The digital data read out from the image memory 1b is analyzed by a controller 1c that operates according to an algorithm (to be described in detail later) stored in a program memory 1d, and image data is rewritten on the basis of the analysis result. The rewritten image data is D/A-converted into an analog image signal by an image output processing module 1e, and the analog image signal is displayed by an image display module 1f by a general method.

Note that the image processing apparatus may have no image display module 1f, and the image output processing module 1e may output an analog image signal to an external apparatus.

FIG. 2 is a flow chart showing the processing according to the first embodiment. FIGS. 3A to 6F are views for explaining the positional relationship among frames.

As shown in FIG. 2, in the first step S11, a reference point is set at a predetermined point of a specific target (corresponding to an object) in the input image. In this embodiment, the chest position of an object (3a in FIG. 3A) in the first frame (i=1) is set as the reference point. FIG. 4A shows the coordinate position of the reference point set in step S11 as P1 (x1, y1). The method of setting the reference point will be explained below. The reference point is used for detecting the shift direction and amount of an object included in a plurality of frames. The reference point may be manually set by the operator or may be automatically set. Since either method is a state-of-the-art technique, a detailed description thereof will be omitted. An example of the setting method will be briefly explained below.

When the reference point is manually set, the operator designates a position or range of a desired object within the frame displayed on the image display module 1f using a pointing device (not shown; e.g., a trackball, mouse, or the like) provided to the image processing apparatus. The controller 1c stores image data of the portion designated by the operator in, e.g., the image memory 1b or the like as a feature image of the reference point. With this operation, the reference point is set in the image processing apparatus. After that, the controller 1c detects the feature image in another frame on the basis of the stored image data, and detects the shift of the object selected by the operator and its direction on the basis of position data of the detected feature image.

When the reference point is automatically set, if a feature portion (e.g., the shape, color, mark, or the like) of an object, on which the reference point is to be set, is known in advance, image data of that feature portion is pre-stored in, e.g., the image memory 1b or the like as a feature image of the reference point. The subsequent position detection method of the object in another frame can follow the same method as upon manual setting.

When a feature portion of the object on which the reference point is to be set cannot be specified in advance, a feature portion can be extracted as the reference point from the object which is being imaged in accordance with the edge image of the object, a shape or color based on a binary image, the peak value of luminance level, or the like. The subsequent position detection method of the object in another frame can follow the same method as upon manual setting on the basis of image data of the extracted feature portion.

In step S12, the number N of frames to be corrected is determined. The method of determining the number of frames to be corrected will be explained below. Image correction in this embodiment belongs to so-called vibration correction. For example, the number of frames may be set during an arbitrary period, in which the operator activates the vibration correction function by turning on a switch (not shown). At this time, even when the switch is kept ON, if image correlation ceases to be detected between two neighboring frames of the photographed image, this indicates that the operator has largely charged the photographing scene. In such case, the controller 1c resets and starts correction again, thus re-setting the number of frames to be corrected. In this embodiment, N=6.

In step S13, coordinate positions P2 (x2, y2) to P6 (x6, y6) of points in the respective frames, which correspond to the reference point P1 in FIG. 4A are obtained, and shift amounts are calculated on the basis of these coordinate positions and the coordinate position (x1, y1) of the reference point P1. For example, the point corresponding to the reference point P1 in the second frame (i=2; FIG. 3B) is P2 (x2, y2), and the difference (x2−x1, y2−y1) from the coordinate position P1 is the shift amount.

In the method of detecting the point corresponding to the reference point, a motion vector may be used. That is, an image is segmented into 8×8 pixel blocks or 16×16 pixel blocks, and pattern matching is done among frames. Moving amount upon matching between two frames corresponds to the shift amount.

In step S14, the entire frame is shifted by the shift amount calculated in step S13 in units of frames to correct the position. At this time, an image data missing portion or outrun portion is formed in units of frames. In the missing portion, zero data is inserted, and data of the outrun portion is abandoned.

Figure 5B:
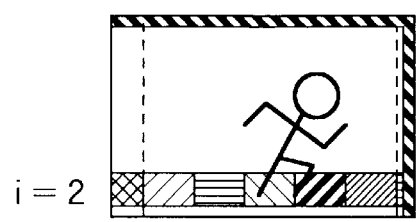

FIGS. 5A to 5F show the states of the respective frames after correction. In the second frame (i=2; FIG. 5B), since the entire frame is shifted downward to the left, data missing portions are formed on the right and upper sides of the frame.

Figure 5C:
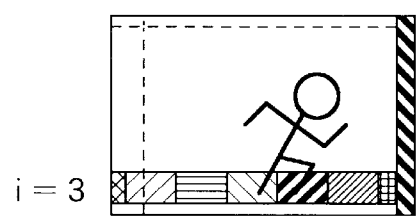
Figure 5D:
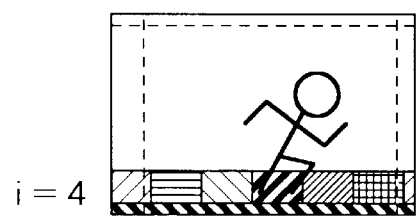
Figure 5E:
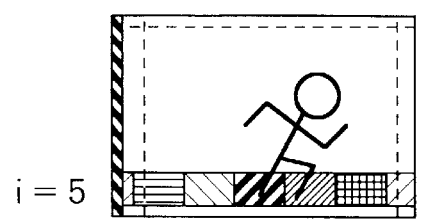
Figure 5F:
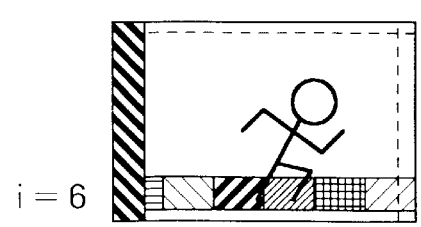

In the third frame (i=3; FIG. 5C), since the entire frame is shifted to the left, a data missing portion is formed at the right side of the frame. Similarly, the fourth frame (i=4; FIG. 5D) has a missing portion on the lower side of the frame, and the fifth and sixth frames (i=5 and 6; FIGS. 5E and 5F) on the left side of the frames.

In step S15, maximum shift amounts in the upper, lower, right, and left directions are calculated. As shown in FIGS. 4A to 4F, if xplus represents the maximum rightward shift amount, xminus represents the maximum leftward shift amount, yplus represents the maximum upward shift amount, and yminus represents the maximum downward shift amount, xplus=x3−x1, xminus=x6−x1, yplus=y2−y1, and yminus=y4−y1.

In step S16, the upper, lower, right, and left portions of each frame are replaced by black level data in correspondence with the maximum shift amounts calculated in step S15. That is, in all the frames (i=1 to 6), the upper, lower, right, and left regions of an image are replaced by black level data in correspondence with the maximum shift amounts. The broken line portions in FIGS. 5A to 5F indicate regions to be replaced by zero data.

Figure 6A:
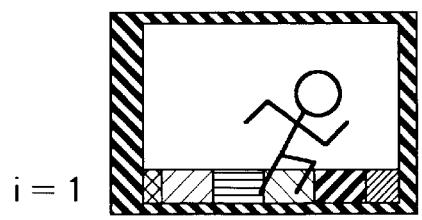
FIGS. 6A to 6F are views for explaining the playback process of a corrected image according to the first embodiment of the present invention.
Figure 6B:
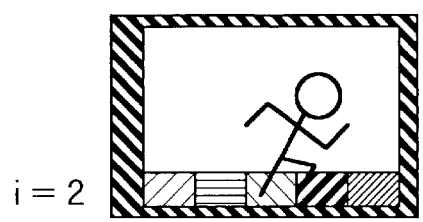
Figure 6C:
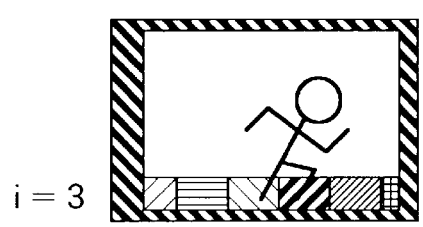
Figure 6D:
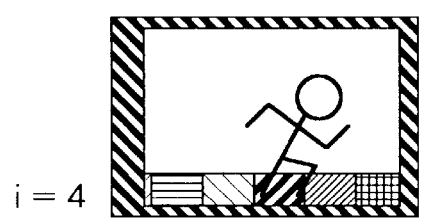
Figure 6E:
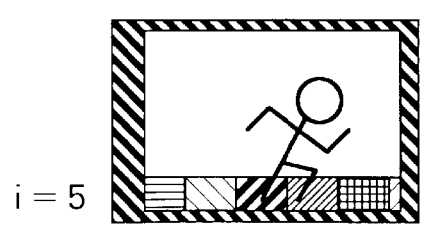
Figure 6F:
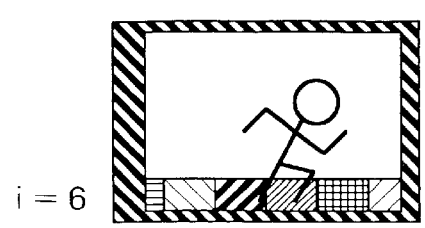

In the final step S17, the images of the frames, the peripheral portions which are corrected by black level data in step S16, are played back, thus ending a series of steps in the algorithm. FIGS. 6A to 6B show playback images generated by the image processing apparatus of this embodiment.

In the embodiment described above, the processing executed in step S11 implements a reference point setting process, and the processing executed in step S13 implements a position detection process and shift amount detection process. Also, the processing executed in steps S14 to S16 implements a corrected image generation process.

To restate, according to this embodiment, even when a blurred moving image is recorded upon input, it can be corrected to be free from any blur upon playback, and the position of the object can be corrected to a predetermined position.

(Second Embodiment)

The second embodiment of an image processing apparatus and method according to the present invention will be described below with reference to the accompanying drawings.

The hardware arrangement of the image processing apparatus of this embodiment is the same as that in the first embodiment described above, and a repetitive description thereof will be avoided. In this embodiment, a program to be stored in the program memory $1d$ is different from that in the first embodiment to implement operation different from the image processing apparatus of the first embodiment described above.

Figure 7:
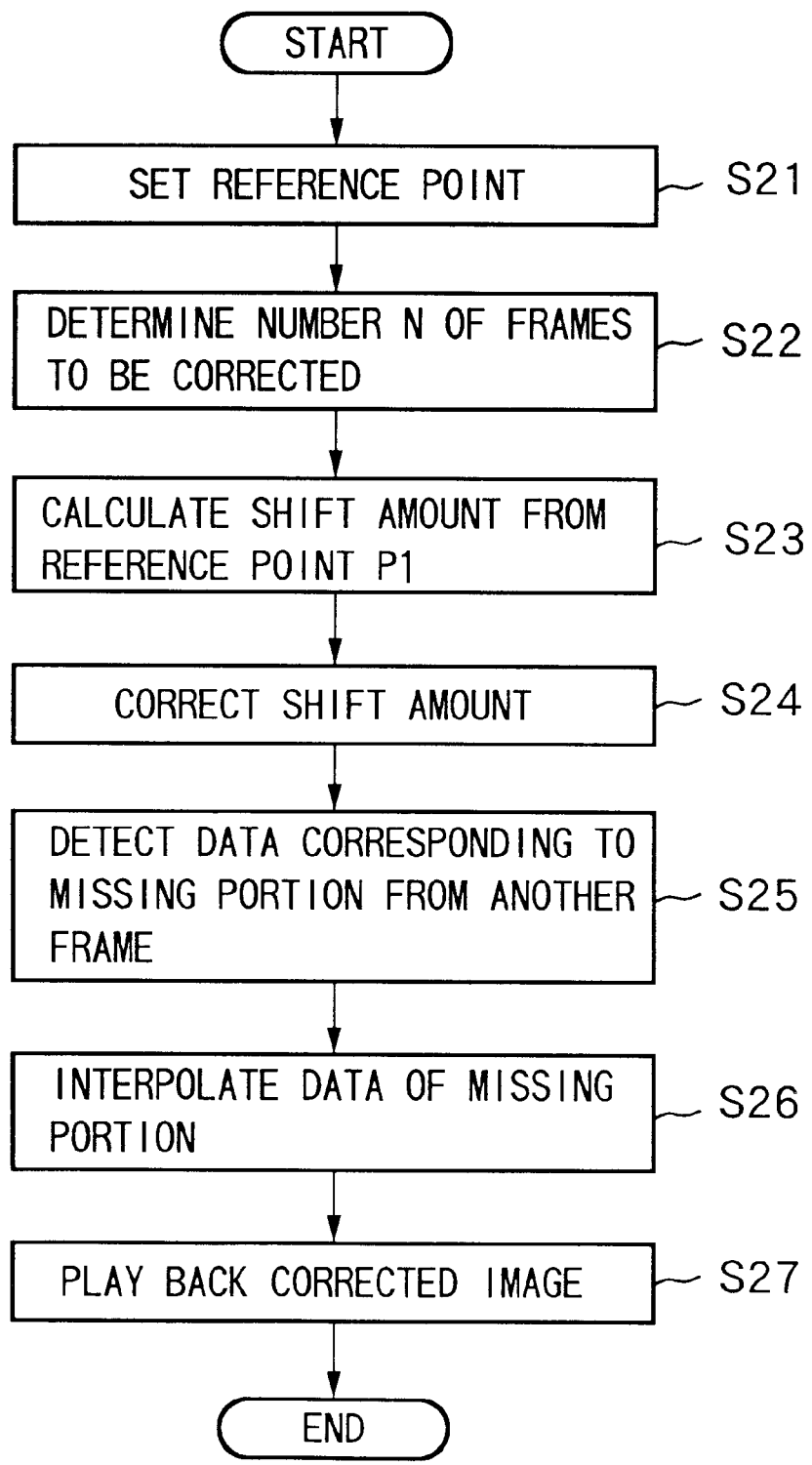
FIG. 7 is a flow chart for explaining an algorithm according to the second embodiment of the present invention.

FIG. 7 is a flow chart showing the outline of the processing of the second embodiment.

As shown in FIG. 7, steps S21 to S24 are the same as those in the first embodiment described above.

Figure 8A:
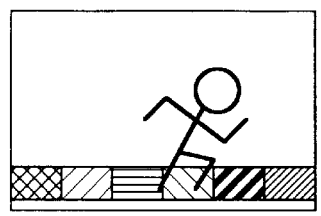
FIGS. 8A to 8F are views for explaining the correction process of shift amount according to the second embodiment of the present invention.
Figure 8B:
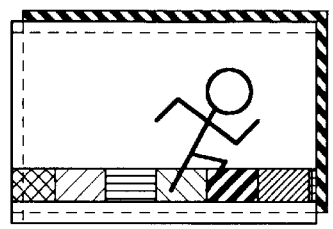
Figure 8C:
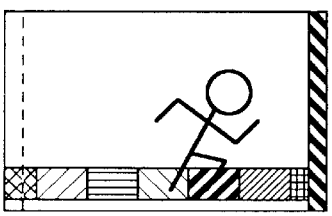
Figure 8D:
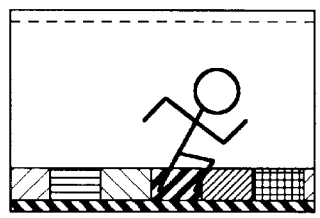
Figure 8E:
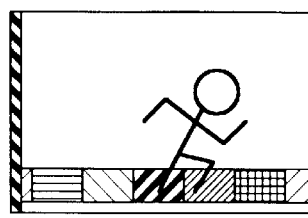
Figure 8F:
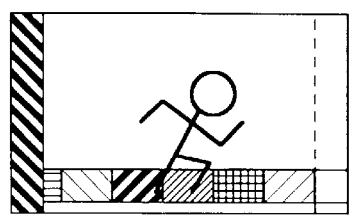

FIGS. 8A to 8F show the states after the respective frames are corrected by shifting them by the calculated shift amounts. As shown in FIGS. 8A to 8F, in the second frame (i=2; FIG. 8B), since the entire frame is shifted downward to the left, data missing portions are formed on the right and upper sides of the frame. In the third frame (i=3; FIG. 8C), since the entire frame is shifted downward to the left, a data missing portion is formed at the right side of the frame. Similarly, the fourth frame (i=4; FIG. 8D) has a missing portion on the lower side of the frame, and the fifth and sixth frames (i=5 and 6; FIGS. 8E and 8F) on the left side of the frames.

In order to correct such missing portions, in this embodiment, processing for detecting data corresponding to the missing portion from another frame is done in step S25. Various methods can be used for detecting the corresponding data, i.e., the corresponding regions in the respective frames. For example, pattern matching of the background region may be used.

The corresponding region detection method of this embodiment using pattern matching will be explained below. For the purpose of convenience, FIGS. 9A to 10F show the detection results of the corresponding regions.

Figure 9A:
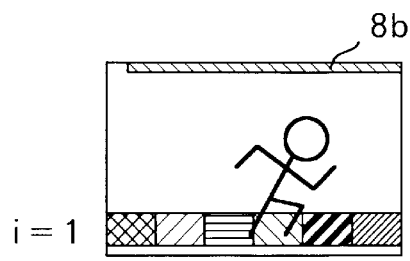
FIGS. 9A to 9F are views for explaining the detection process of an interpolation image according to the second embodiment of the present invention.
Figure 9B:
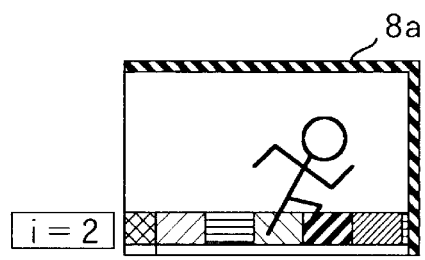
Figure 9C:
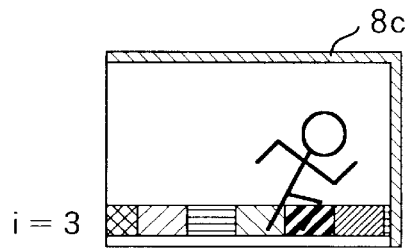
Figure 9D:
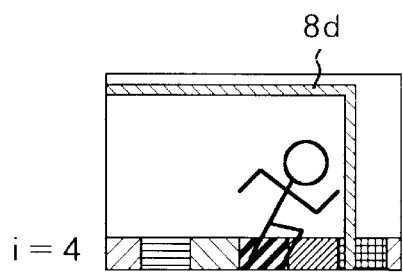
Figure 9E:
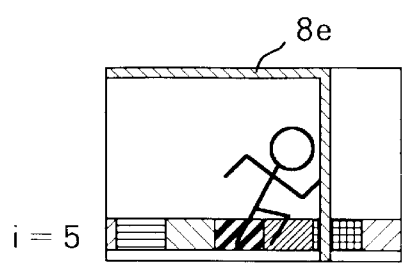
Figure 9F:
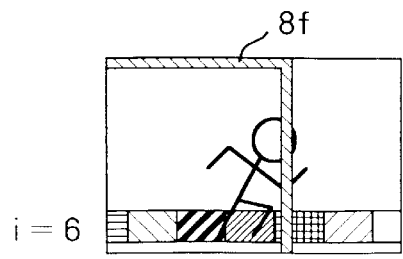

An explanation will be given first with reference to FIGS. 9A to 9F. FIGS. 9A to 9F show an example of detecting regions corresponding to a missing portion ($8a$) of an image in the second frame (i=2; FIG. 9B) by pattern matching. A region $8b$ corresponds to the missing portion in the first frame (i=1; FIG. 9A), and a region $8c$ corresponds to the missing portion in the third frame (i=3; FIG. 9C). Likewise, a region $8d$ corresponds to the missing portion in the fourth frame (i=4; FIG. 9D), and regions $8e$ and $8f$ correspond to the missing portion respectively in the fifth and sixth frames (i=5 and 6; FIGS. 9E and 9F).

Figure 10A:
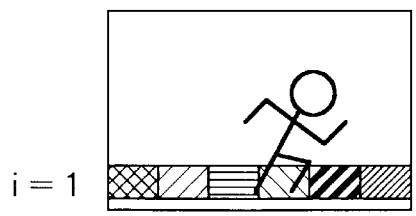
FIGS. 10A to 10F are views for explaining the detection process of an interpolation image according to the second embodiment of the present invention.
Figure 10B:
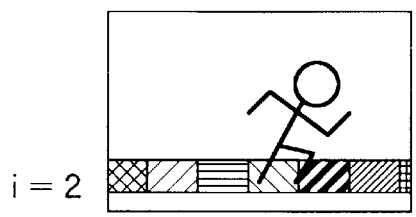
Figure 10C:
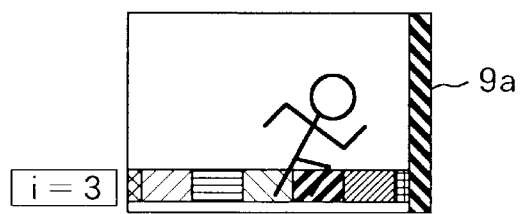

FIGS. 10A to 10F show an example of detecting regions corresponding to a missing portion ($9a$) of an image in the third frame (i=3; FIG. 10C) by pattern matching.

Figure 10D:
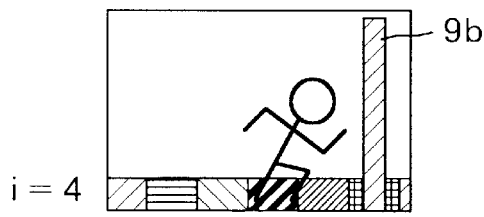
Figure 10E:
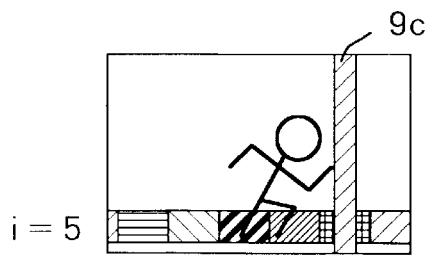
Figure 10F:
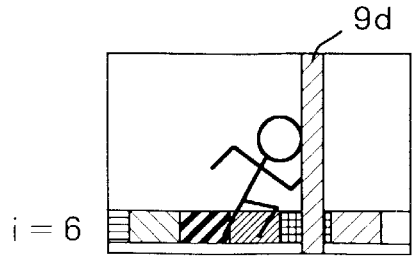

The first and second frames (i=1 and 2; FIGS. 10A and 10B) have no regions corresponding to the missing portion $9a$. However, regions $9b$, $9c$, and $9d$ in the fourth, fifth, and sixth frames (i=4, 5, and 6; FIGS. 10D, 10E, and 10F) correspond to the missing portion.

Figure 11A:
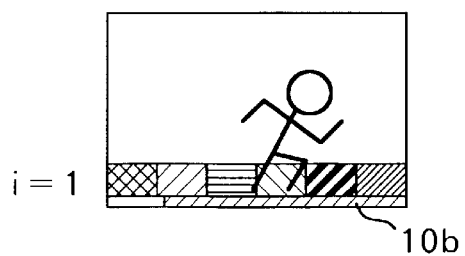
FIGS. 11A to 11F are views for explaining the detection process of an interpolation image according to the second embodiment of the present invention.
Figure 11B:
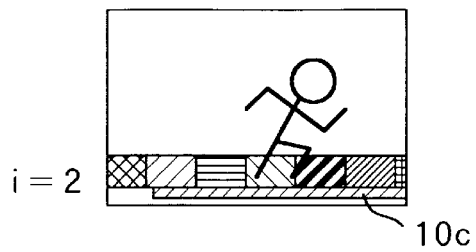
Figure 11C:
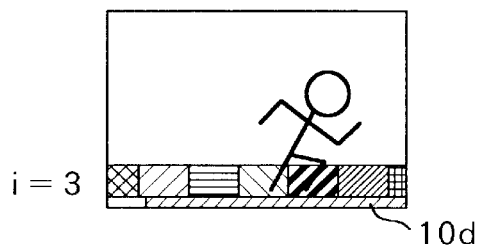
Figure 11D:
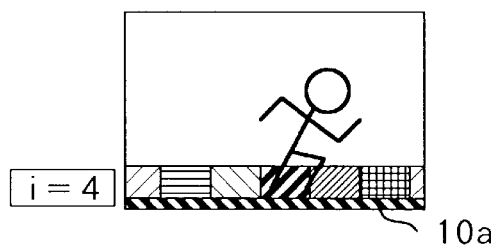
Figure 11E:
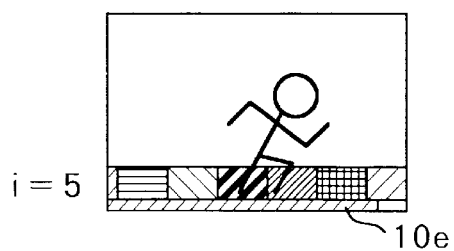
Figure 11F:
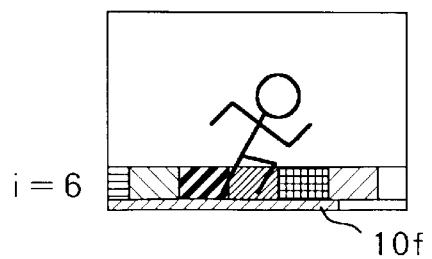
Figure 12A:
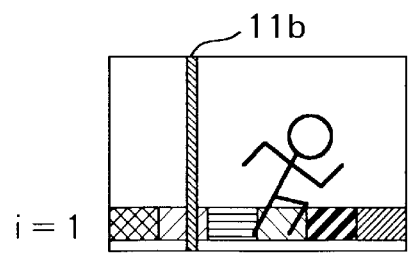
FIGS. 12A to 12F are views for explaining the detection process of an interpolation image according to the second embodiment of the present invention.
Figure 12B:
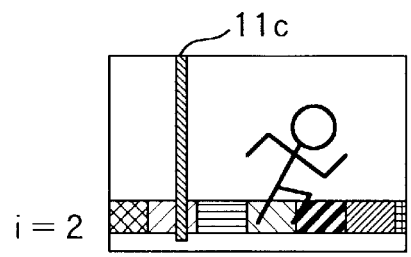
Figure 12C:
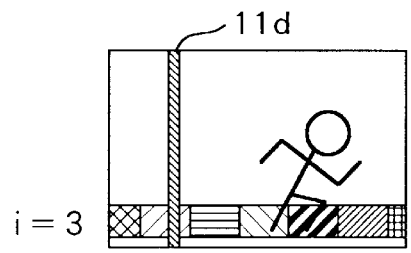
Figure 12D:
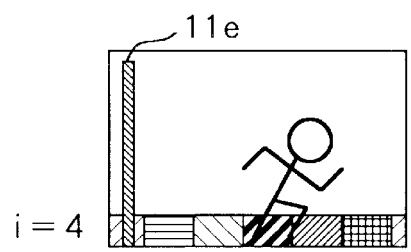
Figure 12E:
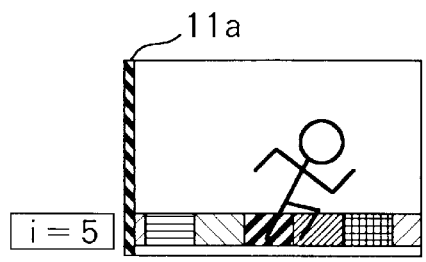
Figure 12F:
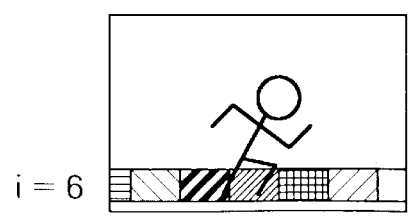
Figure 13A:
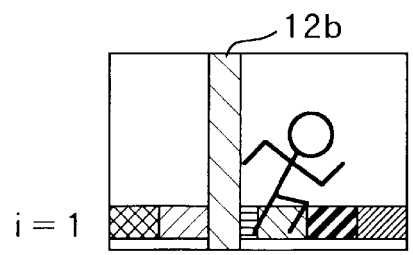
FIGS. 13A to 13F are views for explaining the detection process of an interpolation image according to the second embodiment of the present invention.
Figure 13B:
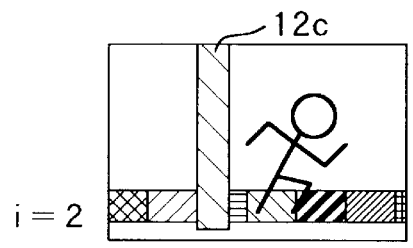
Figure 13C:
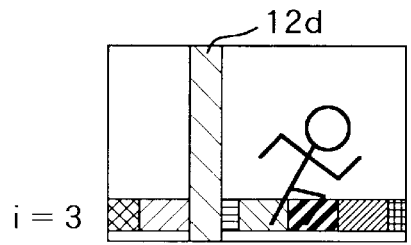
Figure 13D:
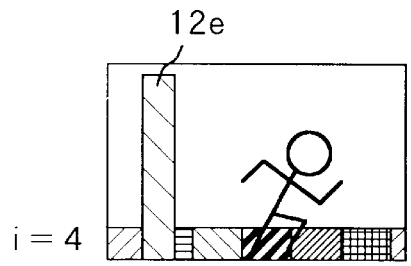
Figure 13E:
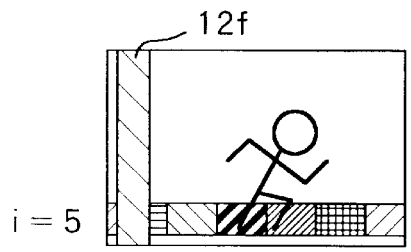
Figure 13F:
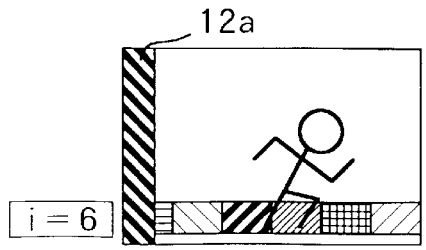

Likewise, FIGS. 11A to 11F, FIGS. 12A to 12F, and FIGS. 13A to 13F respectively show the regions corresponding to missing portions in the fourth, fifth, and sixth frames (i=4, 5, and 6; FIGS. 11D, 12E, and 13F).

An example of the method of detecting the corresponding region will be explained in detail below taking as an example a case wherein a region corresponding to the missing portion of the third frame (i=3; FIG. 10C) is detected from the fourth frame (i=4; FIG. 10D).

Figure 14:
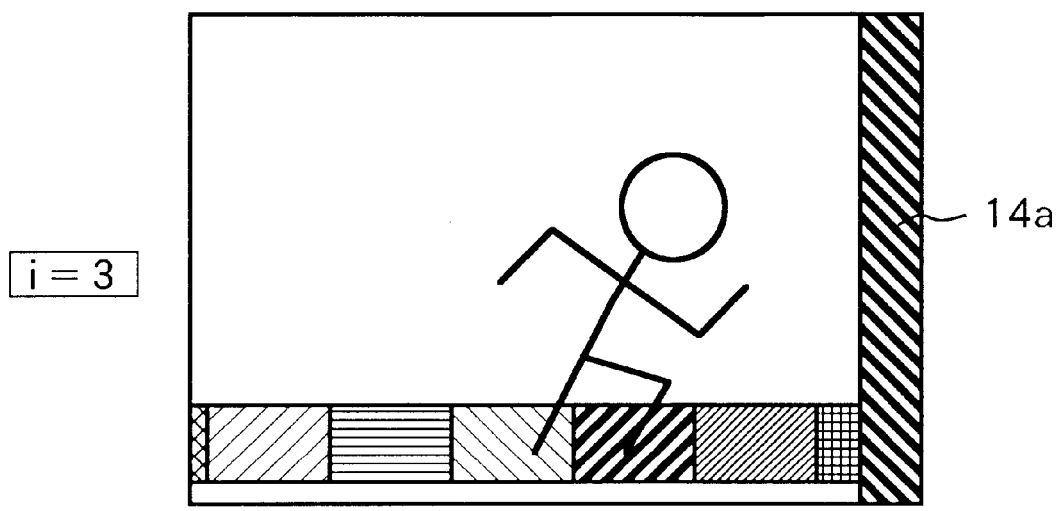
FIG. 14 is a view for explaining the detection process of an interpolation image according to the second embodiment of the present invention in detail, i.e., an enlarged view showing a missing region of the third frame (FIG. 10C)
Figure 15:
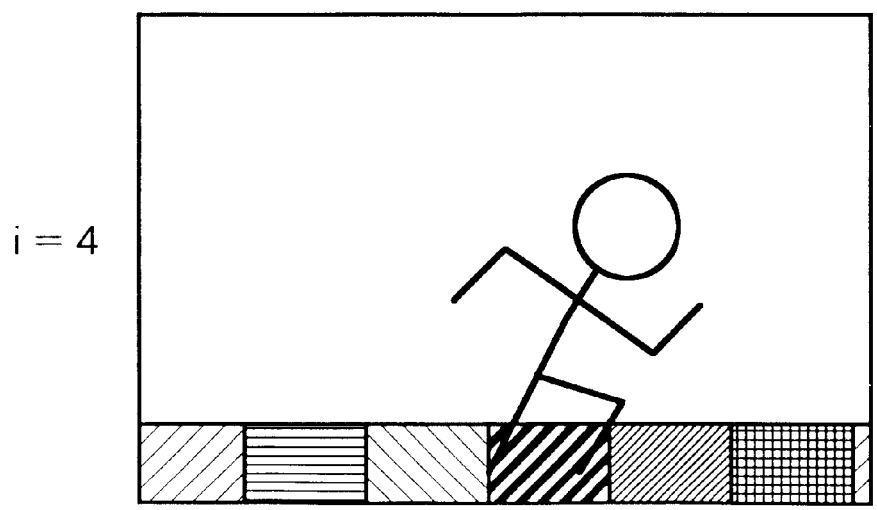
FIG. 15 is a view for explaining the detection process of an interpolation image according to the second embodiment of the present invention in detail, i.e., an enlarged view showing a source image in the fourth frame (FIG. 10D)

FIG. 14 is an enlarged view of FIG. 10C (the third frame (i=3)). FIG. 15 is an enlarged view of FIG. 10D (the fourth frame (i=4)).

Figure 16:
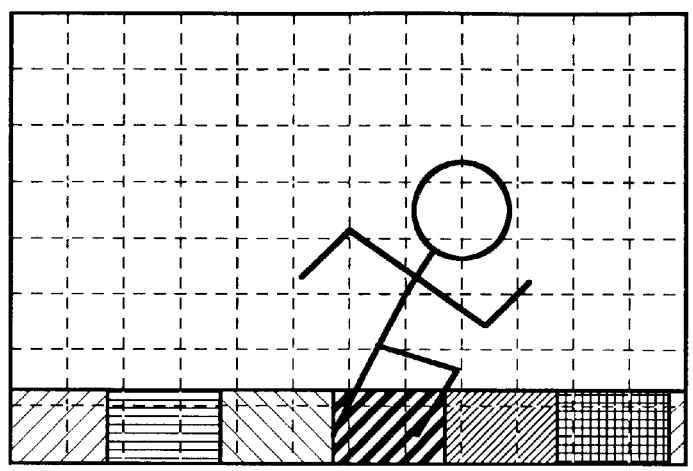
FIG. 16 is a view for explaining the detection process of an interpolation image according to the second embodiment of the present invention in detail, i.e., a view for explaining the source image in the fourth frame which is divided into small blocks.

As shown in FIG. 16, the entire image of the frame shown in FIG. 15 is broken up into a plurality of small blocks (e.g., 16×16 pixel blocks).

Each block of the frame shown in FIG. 15 is pattern-matched with the image shown in FIG. 14. Pattern matching is done by matching each block undergoing search with the image shown in FIG. 14, and searching for a position that minimizes the square sum value of errors of the respective pixels in that block of the image shown in FIG. 14. At this time, a threshold value is set for the square sum value, and even when the position that minimizes the square sum value is detected within the image in FIG. 14, if it exceeds the threshold value, it is determined that there is no corresponding block.

Figure 17:
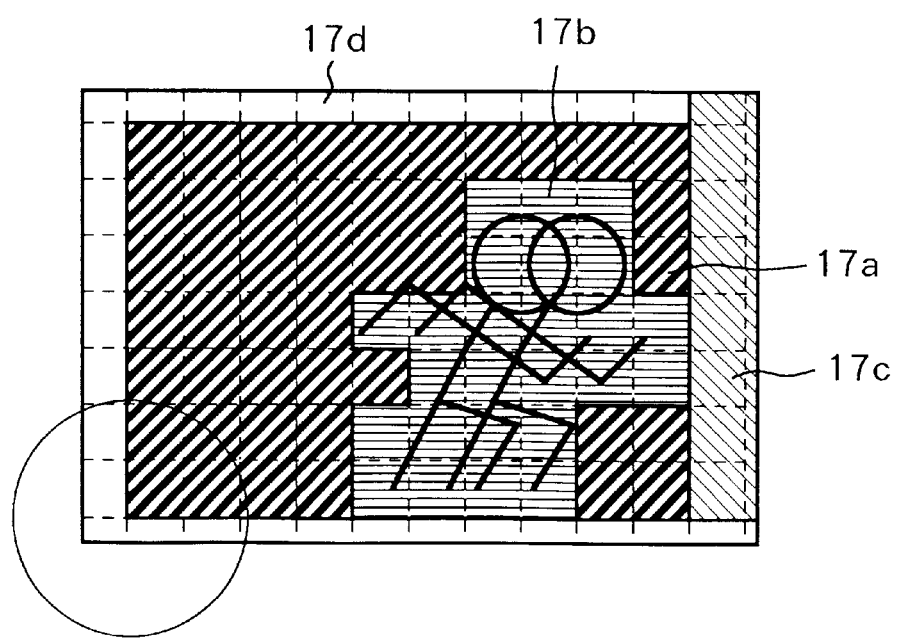
FIG. 17 is a view for explaining the detection process of an interpolation image according to the second embodiment of the present invention in detail, i.e., a view for explaining matching among small blocks.

FIG. 17 shows the pattern matching process of the respective blocks. Referring to FIG. 17, blocks in a region $17a$ form a background portion, i.e., a nearly completely matching region. Blocks in a region $17b$ include an object, and a motion vector different from the background portion is detected.

Figure 18:
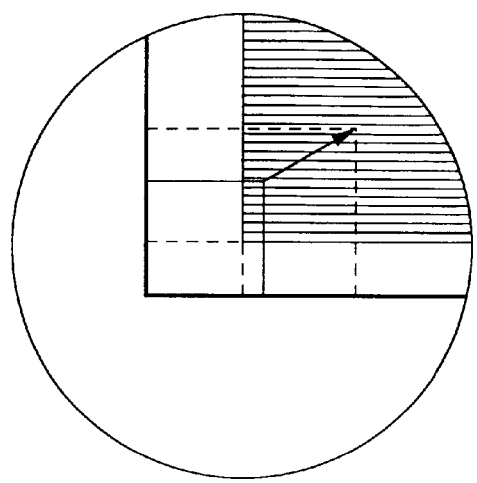
FIG. 18 is a view for explaining the detection process of an interpolation image according to the second embodiment of the present invention in detail, i.e., a view for explaining a motion vector.

Furthermore, a region $17c$ originally corresponds to a region $14a$ in FIG. 14, but no corresponding blocks are detected since this region corresponds to a missing portion as a result of the shift amount correction in step S24. On the other hand, a region $17d$ includes blocks which may not match with a desired block, since it corresponds to the peripheral portion of the frame. Hence, a motion vector to be used is the one common to the blocks in the region $17a$. FIG. 18 is an enlarged view of the motion vector.

Figure 19:
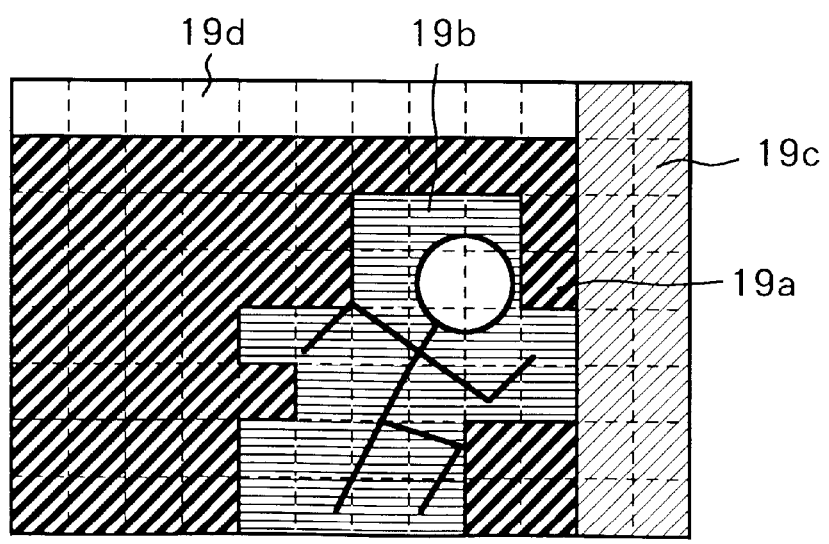
FIG. 19 is a view for explaining the detection process of an interpolation image according to the second embodiment of the present invention in detail, i.e., a view for explaining an interpolation image candidate.
Figure 20:
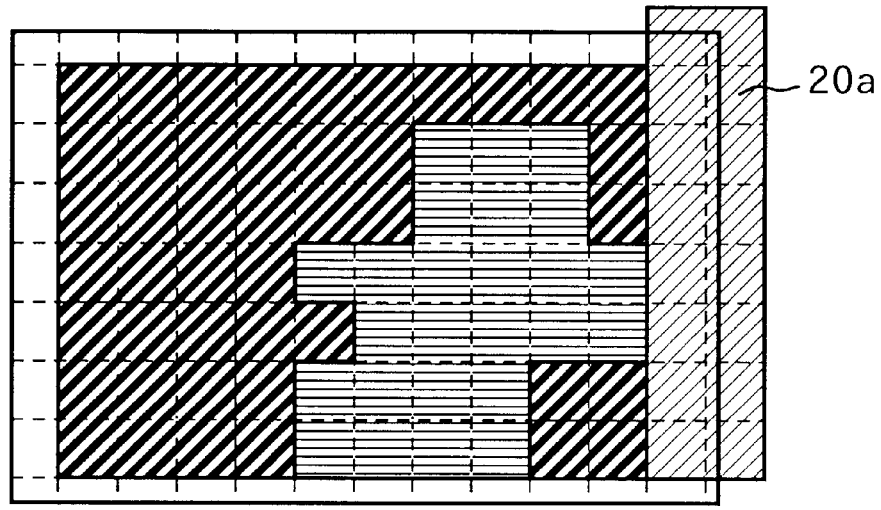
FIG. 20 is a view for explaining the detection process of an interpolation image according to the second embodiment of the present invention in detail, i.e., a view for explaining the moving amount of the interpolation image candidate.

FIG. 19 shows four groups $19a$ to $19d$ of blocks classified in FIG. 16 in correspondence with their motion vectors. Referring to FIG. 19, the block group $19c$ is a candidate region corresponding to the region $14a$ in FIG. 14. By shifting the block group $19c$ by the vector amount in FIG. 18 to match FIG. 14, FIG. 20 is obtained.

Figure 21:
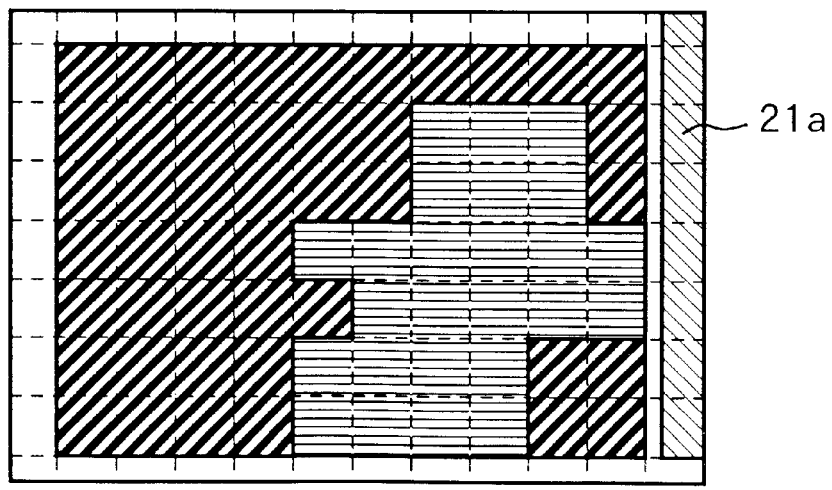
FIG. 21 is a view for explaining the detection process of an interpolation image according to the second embodiment of the present invention in detail, i.e., a view for explaining the region of the interpolation image.
Figure 22:
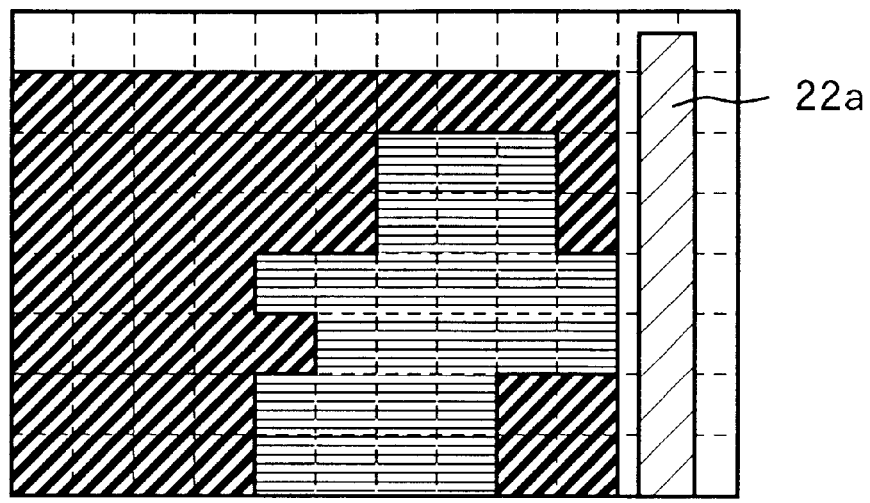
FIG. 22 is a view for explaining the detection process of an interpolation image according to the second embodiment of the present invention in detail, i.e., a view for explaining the position of the interpolation image on the source image.

By abandoning data other than those in the region $14a$ in FIG. 14, a region $21a$ shown in FIG. 21 remains. By placing this region at a position on the fourth frame (i=4), i.e., the position in FIG. 16, a region $22a$ shown in FIG. 22 is obtained.

Figure 23:
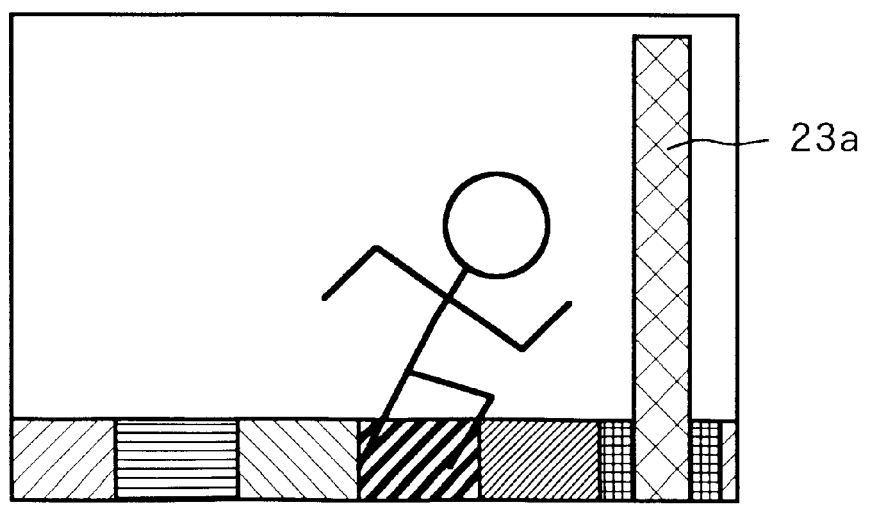
FIG. 23 is a view for explaining the detection process of an interpolation image according to the second embodiment of the present invention in detail, i.e., a view for explaining the detected region of the interpolation image.
Figure 24A:
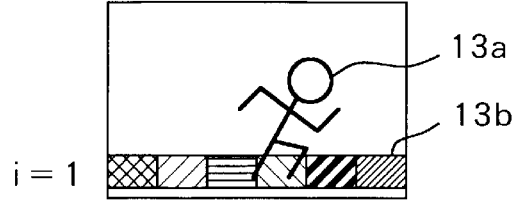
FIGS. 24A to 24F are views for explaining the playback process of a corrected image according to the second embodiment of the present invention.
Figure 24B:
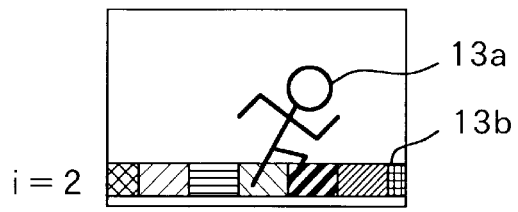
Figure 24C:
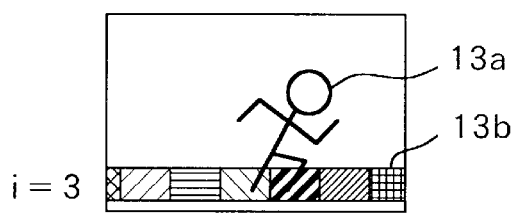
Figure 24D:
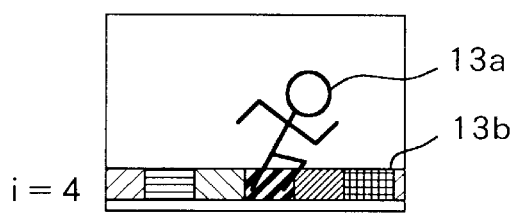
Figure 24E:
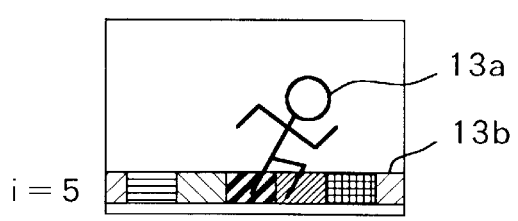
Figure 24F:
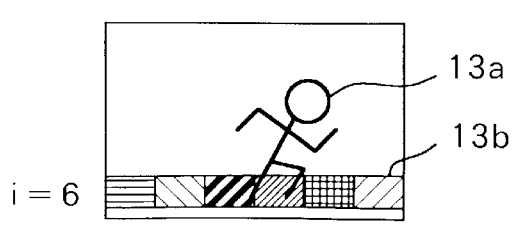

FIG. 23 is view showing image data corresponding to the respective blocks, i.e., an enlarged view showing the fourth frame (i=4) in FIG. 10D. By executing such procedure for each frame, detection of the corresponding region, i.e., an interpolation image candidate can be obtained.

In step S26, data of the missing portion is generated by interpolation. The data interpolation method in this step will be explained below.

If there are a plurality of interpolation image candidates, the respective images are weighted. More specifically, M represents the data to be interpolated, Di represents the interpolation candidate, and αi (i=±1, ±2, . . . ) represents a weighting coefficient. Note that i represents the temporal distance from the data to be interpolated. If there is no interpolation candidate data Di, αi is also set at zero. These parameters satisfy:

$$M = \Sigma(\alpha i \cdot Di) / \Sigma \alpha i \ (i = \pm 1, \pm 2, \ldots) \quad (1)$$

In general, the correlation between data becomes stronger as the temporal distance becomes shorter. For this reason, as the absolute value of i in equation (1) is smaller, α assumes a larger value. The boundary between the interpolation image and source image may be filtered in post-processing to avoid discontinuity.

In step S27, the images of the respective corrected frames are played back, thus ending a series of steps in the algorithm. FIGS. 24A to 24F show playback images equivalent to those formed in an ideal camera work, which are processed by the image processing apparatus of this embodiment. The processing executed in steps S25 and S26 above implements an insertion data generation process.

As described above, according to this embodiment, the position of the object can be corrected to a predetermined position as in the first embodiment. Furthermore, since an image data missing portion formed in a given frame by the correction can be obtained by interpolating image data in the corresponding region of another frame, a playback image with a size larger than that in the first embodiment can be obtained.

(Another Embodiment of Present Invention)

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The scope of the present invention includes a case achieved by supplying a program code of software for realizing the functions of the above embodiment to a computer in an apparatus or system connected to various devices so as to operate the various devices to implement the functions of the above embodiment, and operating the various devices in accordance with the stored program by the computer (CPU or MPU) of the apparatus or system.

In this case, the program code itself of software realizes the functions of the above-mentioned embodiment, and the program code itself, and means for supplying the program code to the computer (e.g., a storage medium which stores the program code) constitute the present invention. As the storage medium for storing the program code, for example, a floppy disk, hard disk, optical disk, magneto-optical disk, CD-ROM, magnetic tape, nonvolatile memory card, ROM, and the like may be used.

Not only when the functions of the above embodiment are implemented by executing the supplied program code by the computer but also when the functions of the above embodiment are implemented by collaboration of the program code and an OS (operating system) running on the computer, another application software, or the like, such program code is included in the embodiment of the present invention.

Furthermore, when the supplied program code is stored in a memory equipped on a function extension board of the computer or a function extension unit connected to the computer, a CPU or the like equipped on the function extension board or unit executes some or all of actual processes on the basis of the instruction of that program code, and the functions of the above embodiment are implemented by those processes, such case is also included in the present invention.

To recapitulate, according to the aforementioned embodiments, a reference point is set at a predetermined point of a specific object included in a moving image formed by a plurality of successive images, the positions of the predetermined points of the specific object corresponding to the reference point are detected from other images, which are temporally different from the image set with the reference point, shift amounts in the respective videos are calculated based on the detected positions of the predetermined points and the position of the reference point, and images corrected in correspondence with the shift amounts are generated. In this manner, the object can be displayed to be free from any blur in the display screen, and even when a motion video is recorded with a blurred object upon photographing, the object can be prevented from being blurred upon playback. The position of the object which is being tracked by the photographer can be corrected to a predetermined position in the frame, and a stable video can be obtained.

Also, a stable video free from any blur of an object image can be obtained, and the frame size need not be changed. Hence, a video which can minimize shortcomings derived from vibration correction can be generated and displayed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for correcting a position of a specific object included in a moving image formed by a plurality of successive images to a predetermined position on a frame, comprising:

reference point setting means for setting a reference point on the object included in a first image which serves as a reference image;

position detection means for detecting a position of a corresponding point, which corresponds to the reference point in the first image, in each of a plurality of second images which are different from the first image;

shift amount detection means for detecting a shift amount of the object between the first image and each of the second images on the basis of a distance between the position of the corresponding point detected from each of the plurality of second images, and a position of the reference point; and corrected image generation means for generating a corrected image by correcting position of the object included in each of the plurality of second images in accordance with the shift amounts detected by said shift amount detection means in units of the second images, wherein said corrected image generation means includes:
image shift means for shifting the plurality of second images in correspondence with the shift amounts detected by said shift amount detection means in units of images; and
image synthesis means for selecting images corresponding to missing portions, which have formed with respect to original recording regions of the plurality of second images upon shifting the second images by said images shift means, from the plurality of second images, and synthesizing the selected images as the images of the missing portions;
wherein said image synthesis means includes pattern matching means for dividing the second image as an object from which the images of the missing portion is to be selected, into a plurality of blocks, and selecting the image of the missing portion on the basis of matching results between the respective blocks and an image having the missing portion and for using a shift amount of a background portion obtained by excluding the object from each of the plurality of second image as a reference for matching.

2. The apparatus according to claim 1, further comprising display means for displaying the corrected image, which is corrected by said corrected image generation means.

3. The apparatus according to claim 1, wherein said corrected image generation means further includes:
maximum shift amount detection means for detecting maximum shift amounts in upper, lower, right, and left directions from the shift amounts produced with respect to original recording regions of the plurality of second images upon shifting the second images by said image shift means; and
predetermined image insertion means for generating the corrected image of the moving image by inserting a predetermined image corresponding to the maximum shift amounts in the upper, lower, right, and left directions detected by said maximum shift amount detection means in the first image and the plurality of second images, which have been shifted by said image shift means.

4. The apparatus according to claim 1, wherein the plurality of images are frame images.

5. An image processing method for correcting a position of a specific object included in a moving image formed by a plurality of successive images to a predetermined position on a frame, comprising:
a reference point setting step of setting a reference point on the object included in a first image which serves as a reference image;
a position detection step of detecting a positions of a corresponding point, which correspond to the reference point, in the first image, in each of a plurality of second images, which are different from the first image;
a shift amount detection step of detecting a shift amount of the object between the first image and each of the second images on the basis of a distance between the position of the corresponding point detected from each of the plurality of second images, and a position of the reference point; and
a corrected image generation step of generating a corrected image of the moving image by correcting position of the object included in each of the plurality of second images in accordance with the shift amounts detected in units of the second images,
wherein said corrected image generation step includes:
an image shift step for shifting the plurality of second images in correspondence with the shift amounts detected by said shift amount detection step in units of images; and
an image synthesis step for selecting images corresponding to missing portions, which have formed with respect to original recording regions of the plurality of second images upon shifting the second images by said images shift step, from the plurality of second images, and synthesizing the selected images as the images of the missing portions;
wherein said image synthesis step includes a pattern matching step for dividing the second image as an object from which the images of the missing portion is to be selected, into a plurality of blocks, and selecting the image of the missing portion on the basis of matching results between the respective blocks and an image having the missing portion and for using a shift amount of a background portion obtained by excluding the object from each of the plurality of second image as a reference for matching.

6. The method according to claim 5, wherein the corrected image generation step further includes:
a maximum shift amount detection step of detecting maximum shift amounts in upper, lower, right, and left directions from the shift amounts produced with respect to original recording regions of the plurality of second images upon shifting the second images in the images shift step; and
a predetermined images insertion step of generating the corrected image of the moving image by inserting a predetermined image corresponding to the maximum shift amounts in the upper, lower, right, and left directions detected in the maximum shift amount detection step in the first image and the plurality of second images, which have been shifted in the image shift step.

7. A computer-readable storage medium, which stores an image processing program for correcting a position of a specific object included in a moving image formed by a plurality of successive images to a predetermined position on a frame, said image processing program having:
a code of a reference point setting step of setting a reference point on the object included in a first image which serves as a reference image;
a code of a position detection step of detecting a position of a corresponding point, which corresponds to the reference point in the first image in each of a plurality of second images, which are different from the first image;
a code of a shift amount detection step of detecting a shift amount of the object between the first image and each of the second images on the basis of a distance between the positions of the corresponding points detected from each of the plurality of second images, and a position of the reference point; and
a code of a corrected image generation step of generating a corrected image by correcting position of the object included in each of the plurality of second images in accordance with the shift amount detected in units of the second images,
wherein the code of corrected image generation step includes:
a code of an image shift step of shifting the plurality of second images in correspondence with the shift amounts detected in said shift amount detection step in units of images; and
a code of an image synthesis step of selecting images corresponding to missing portions, which have formed with respect to original recording regions of the plurality of second images upon shifting the second images in said image shift step, from the plurality of second images, and synthesizing the selected images as the images of the missing portions,
wherein the code of the image synthesis step includes a code of a pattern matching step for dividing the second image as an object from which the images of the missing portion is to be selected, into a plurality of blocks, and selecting the image of the missing portion on the basis of matching results between the respective blocks and an image having the missing portion and for using a shift amount of a background portion obtained by excluding the object from each of the plurality of second image as a reference for matching.

8. The medium according to claim 7, wherein the code of the corrected image generation step further includes:

a code of a maximum shift amount detection step of detecting maximum shift amounts in upper, lower, right, and left directions from the shift amounts produced with respect to original recording regions of the plurality of second images upon shifting the second images in the images shifting step; and a code of a predetermined image insertion step of generating the corrected image of the moving image by inserting a predetermined image corresponding to the maximum shift amounts in the upper, lower, right, and left directions detected in the maximum shift amount detection step in the first image and the plurality of second images, which have been shifted in the image shift step.

* * * * *

UNITED STATES PATENT AND TRADEMARK OFFICE
CERTIFICATE OF CORRECTION

PATENT NO. : 6,784,927 B1
DATED : August 31, 2004
INVENTOR(S) : Osamu Itokawa

It is certified that error appears in the above-identified patent and that said Letters Patent is hereby corrected as shown below:

Title page,
Item [75], Inventor, should read -- Osamu Itokawa, Tokyo (JP) --

Column 10,
Line 35, please delete "a" after "detecting"

Signed and Sealed this

Eighth Day of March, 2005

JON W. DUDAS
*Director of the United States Patent and Trademark Office*